(12) United States Patent
Filias et al.

(10) Patent No.: US 7,397,548 B2
(45) Date of Patent: Jul. 8, 2008

(54) METHOD OF DETECTING SUSPENDED FILAMENTARY OBJECTS BY TELEMETRY

(75) Inventors: François-Xavier Filias, Lambesc (FR); Jean Sequeira, Marseilles (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 11/791,152

(22) PCT Filed: Jul. 6, 2006

(86) PCT No.: PCT/FR2006/001663

§ 371 (c)(1),
(2), (4) Date: May 21, 2007

(87) PCT Pub. No.: WO2007/010113

PCT Pub. Date: Jan. 25, 2007

(65) Prior Publication Data

US 2008/0007708 A1   Jan. 10, 2008

(30) Foreign Application Priority Data

Jul. 20, 2005   (FR) .................................. 05 07702

(51) Int. Cl.
*G01B 3/36* (2006.01)
(52) U.S. Cl. ................................. 356/139.03
(58) Field of Classification Search ............. 356/139.03
See application file for complete search history.

(56) References Cited

U.S. PATENT DOCUMENTS 3,069,654 A   12/1962   Hough
5,296,909 A   3/1994   Fazi et al.
7,046,841 B1*   5/2006   Dow et al. ................... 382/154
2002/0130792 A1*   9/2002   Schaefer ...................... 340/945

FOREIGN PATENT DOCUMENTS

FR   2 736 149   1/1997

OTHER PUBLICATIONS

Fabish et al., "New Approach to Laser Image Processing for Dynamic Scenes", Proceedings of the SPIE, Int. Soc. Opt. Eng. USA, vol. 3065, pp. 224-234 (1997).

* cited by examiner

*Primary Examiner*—Thomas H. Tarcza
*Assistant Examiner*—Luke D Ratcliffe
(74) *Attorney, Agent, or Firm*—Young & Thompson

(57) ABSTRACT

A method of detecting the presence of a suspended filamentary object in view of a telemeter on an aircraft includes: i) calculating terrestrial coordinates of points corresponding to telemeter echoes, and selecting candidates; ii) searching a horizontal plane for straight line segments close to vertical projections of candidate points; and iii) searching each vertical plane containing one of the straight line segments for portions of catenaries close to candidate points. In step iii), for each considered vertical plane and each triplet of candidate points close to the considered vertical plane, calculating values of three parameters of a catenary containing the projections on the vertical plane of the three points of the considered triplet, and determining presence of at least one suspended filamentary object as a function of the distribution of values of catenary parameters calculated for all of the triplets of candidate points close to the vertical plane under consideration.

9 Claims, 2 Drawing Sheets

METHOD OF DETECTING SUSPENDED FILAMENTARY OBJECTS BY TELEMETRY

The present invention relates to a method for use on board an aircraft to detect suspended filamentary objects by telemetry.

FIELD OF THE INVENTION

The technical field of the invention is that of manufacturing rotary-wing aircraft.

Numerous aviation accidents are the result of cables or other suspended filamentary obstacles being detected wrongly or not at all, thereby reducing the range over which aircraft and in particular rotorcraft can be used when flying close to the ground.

The present invention relates more particularly to a method of detecting cables or similar suspended filamentary objects by telemetry, which method is sufficiently reliable and fast to be implemented in a computer on board an aircraft so as to deliver a useful warning signal to a human or automatic pilot in time, and in "real" time, so as to enable the aircraft to avoid the filamentary object.

BACKGROUND OF THE INVENTION

Proposals have already been made in patents FR 2 736 149 and U.S. Pat. No. 5,762,292 for a system for recognizing structures presenting rectilinear portions in an image delivered by a sensor on board a flying object, by using a method that implements a parametric transform (Hough transform) of a portion of the image.

The Hough transform, which is described in U.S. Pat. No. 3,069,654, enables a set of aligned points to be detected in an image.

Proposals are made in U.S. Pat. No. 5,296,909 to detect the presence of cables by means of a scanning laser telemeter (Lidar) that delivers echoes or plots, where each plot corresponds to a point in three-dimensional space that is characterized by its three coordinates in that space: the telemeter emits laser pulses that, by measuring their travel times, enable points to be obtained that are positioned in 3D space (3D plots). The echoes are filtered; a set of parameters is determined by the Hough transform for all possible groups of filtered echoes; accumulations of points in the parameter space are identified, and the position of a cable is determined by an inverse Hough transform.

Proposals are also made in U.S. Pat. No. 6,747,576 to detect the presence of electrical power lines by forming a cloud of measurement points in a terrestrial coordinate system on the basis of data delivered by a remote detection sensor and data delivered by a navigation system, and by eliminating measurement points that represent the ground; the method then comprises searching for straight lines amongst the projections of the measurement points onto a horizontal plane, by performing two successive Hough transforms: a "pure" transform using a delta function (Dirac function), followed by a "fuzzy" transform where the delta function is replaced by a Gaussian distribution; thereafter a search is made for catenaries in each vertical plane containing one of the straight lines as found in that way, said search likewise comprising two successive Hough transforms.

In order to search for a catenary corresponding to the equation:

$$z = a^* \cos h((\lambda - b)/a) + c$$

for each measurement point in each vertical plane, and for each possible value of a catenary parameter a, a two-dimensional Hough transform of the catenaries passing through said point is calculated (in the b and c parameter space).

That method requires very considerable computation time because of the three-dimensional nature of the space to be searched, and it also requires a specific accelerator card, even when selecting a large digitization step and small ranges for the catenary parameters, to the detriment of result accuracy.

Although certain cable detection systems have already been described, at present there does not exist any system that is effective in bad weather conditions.

Present detector systems also lack performance in clear weather: when the sighting angle is large, a telemeter detects only a few 3D plots for the complete structure of a cable; in practice, it is then not possible to determine the presence of a cable, nor to situate it in three-dimensional space.

OBJECTS AND SUMMARY OF THE INVENTION

An object of the invention is to propose a method of detecting the presence of suspended filamentary objects by processing telemetry measurements, which method is improved and/or remedies, at least in part, the shortcomings and the drawbacks of known similar methods.

The invention applies in particular to a method of detecting the presence of a suspended filamentary object in the field of view of a telemeter on board an aircraft, the method comprising the following steps:

i) calculating the terrestrial coordinates of points corresponding to echoes delivered by the telemeter, and selecting candidate points from said points;

ii) searching in a horizontal plane for straight line segments that are close to vertical projections of the candidate points; and iii) searching in each vertical plane containing one of the straight line segments found in step ii) for portions of catenaries that are close to the candidate points.

In accordance with an aspect of the invention, and in step iii), for each vertical plane under consideration, for each triplet of candidate points close to the vertical plane under consideration, the method further comprises calculating the values of three parameters a, b, and c of a catenary (of simplified equation: $y = a^* \cos h((x/a) + b) + c$) containing the projections on the vertical plane of the three points of the triplet under consideration, and then determining the presence of at least one suspended filamentary object as a function of the distribution (in particular of the maxima) of values of catenary parameters calculated for all of the triplets of candidate points close to the vertical plane under consideration.

In spite of the fact that calculations are performed for all triplets of candidate points, and not merely for all candidate points, the total number of operations that need to be performed is much smaller than the number of operations required by the method described in U.S. Pat. No. 6,747,576. In addition, the method of the invention makes it possible to determine catenary parameters accurately, and consequently provides high performance in detecting filamentary obstacles.

Preferably, in order to calculate the three parameters a, b, and c of a catenary containing the projections of the three points of a triplet, the calculation begins by making an estimate a0 of a first parameter a; thereafter the first parameter a is calculated as a function of the estimate a0; and then the second parameter b is calculated as a function of the first parameter a; and finally the third parameter c is calculated as a function of the first parameter a and of the second parameter b; these calculations are performed from the two coordinates of the projection (into the vertical plane under consideration) of each of the three candidate points of the triplet under consideration.

Also preferably, in order to calculate an estimate a0 of a first parameter a, the parabola (in the vertical plane under consideration) that contains the three projections of the points of the triplet under consideration is determined, which amounts to replacing the hyperbolic cosine of the catenary equation by a third order Taylor series.

Thereafter, the first parameter a is preferably calculated as a function of the estimate a0 by a series of Newtonian iterations; after the iterative calculation has converged on the first parameter a, the other two parameters b and c are calculated analytically.

Once the three catenary parameter values have been calculated for all of the triplets of candidate points close to the vertical plane under consideration, the presence of at least one suspended filamentary object (in said plane) is determined by determining the maximum or the maxima in a three-dimensional parameter space made up of parameters that are linked to the three catenary parameters by linear relationships; in particular, when these maxima are determining in the [(a+b),−b*a,c] parameter space, it has been found that results are improved compared with using the [a,b,c] parameter space.

BRIEF DESCRIPTION OF THE DRAWINGS

Other characteristics and advantages of the invention appear from the following description which refers to the accompanying drawings that show without any limiting character preferred implementations of the invention.

MORE DETAILED DESCRIPTION

Unless specified to the contrary, the term "plot" can be understood as being used below to designate a "point".

In order to detect cables in robust manner on board a helicopter, it is preferable to use an active scanning sensor, in particular a LIDAR (light detection and ranging) or a RADAR. Such sensors acquire "raw" plots in spherical coordinates: elevation (S), azimuth (G), and range (D).

Using the components (Vx,Vy,Vz) of the velocity vector $\overline{V}$ and the attitude data (roll ($\phi$), pitch ($\theta$), heading ($\phi$)) of the aircraft as delivered by an inertial unit, for example, coordinates (x,y,z) are calculated in a rectangular coordinate system that is terrestrial (referenced to the ground), e.g. by means of an on-board computer.

Figure 1:
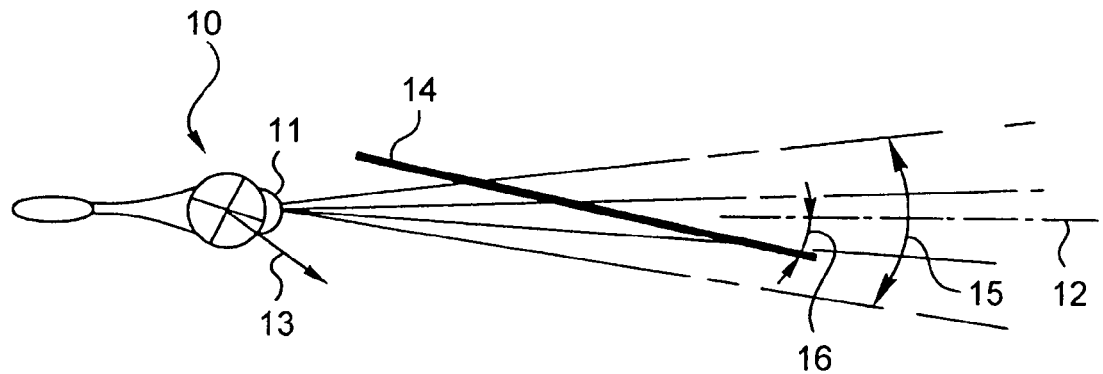
FIG. 1 is a diagrammatic plan view of a helicopter fitted with a telemeter scanning a sector of the space that extends in front of the helicopter and in which there extends a suspended wire.

With reference to FIG. 1, a helicopter 10 is fitted with a Lidar 11 scanning a sector of the space extending on either side of a sighting axis 12.

The helicopter is moving along a vector 13; a cable 14 extends in part in the field 15 of the telemeter 11; the trace of the cable 14 in a horizontal plane, in particular in the plane of FIG. 1, forms a straight line segment that is sloping slightly, at a sighting angle 16, relative to the sighting direction 12 of the telemeter.

The number of echoes returned to the telemeter by a portion of the cable depends on the distance between said portion of cable and the telemeter. Furthermore, if the (sighting or incidence) observation angle 16 is small, the probability of echoes being returned by the cable is also small.

Thus, depending on the angle of incidence of the sensor and on the distance between the cable and the helicopter, it can happen that few or no echoes are obtained; as a result, it can happen that cables are not detected and no warning is given to the pilots.

The method of detecting filamentary obstacles described below enables all cables to be detected in robust manner, regardless of the conditions of approach (incidence), distance, and noise in the scene observed by the telemeter.

The raw 3D plots acquired during one (or more) scans of the sensor and then converted into a rectangular frame of reference are processed by an algorithm in order to detect portions of suspended cables, and present them to the user.

Figure 3:
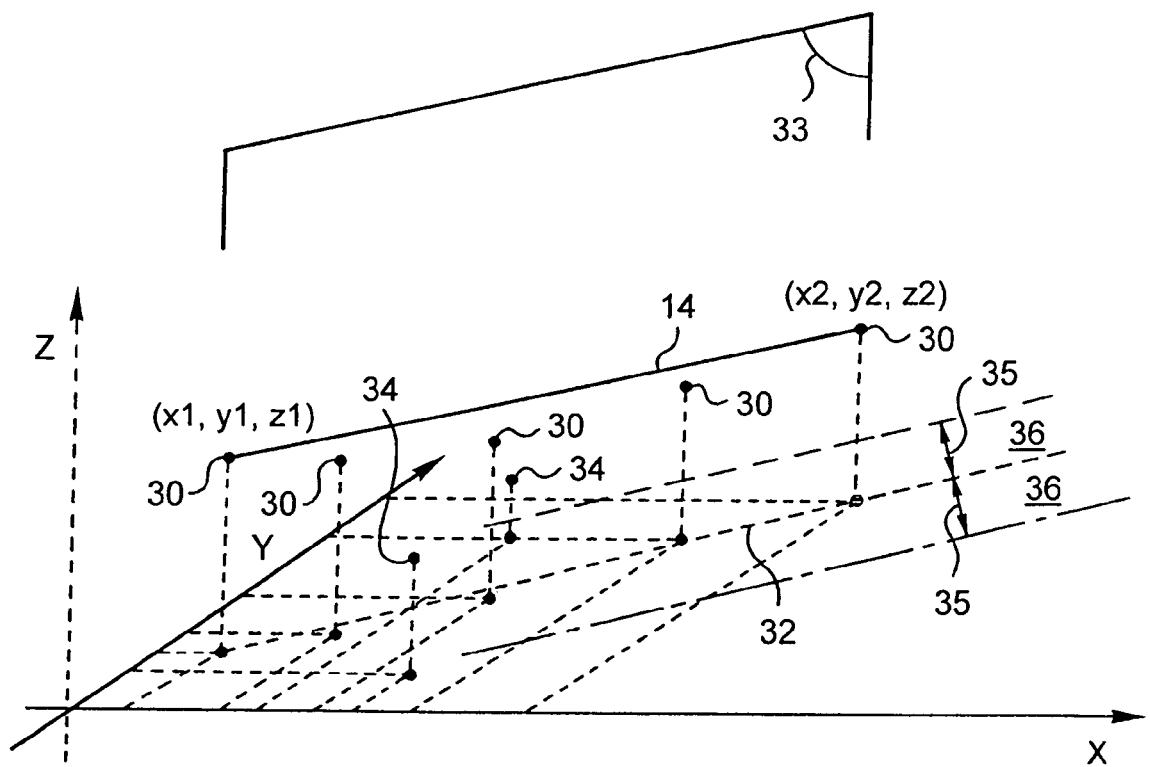
FIG. 3 is a diagrammatic perspective view showing certain aspects of the method of detecting a catenary shape from a group of points in space.
Figure 2:
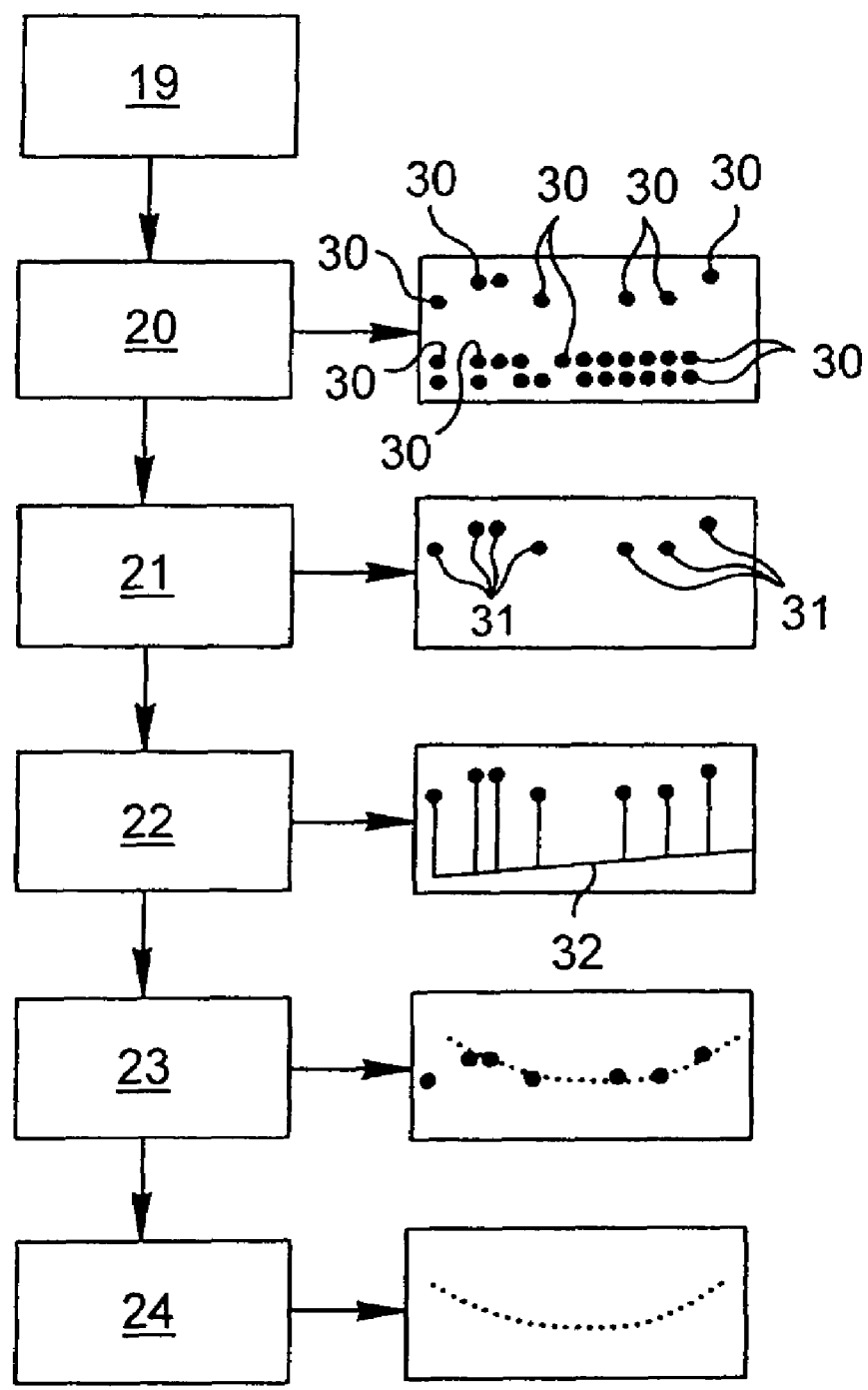
FIG. 2 is a diagram showing the main stages of a detection method and also showing the results obtained at the end of each stage.

The detection method comprises three main successive steps shown in FIG. 2:

i) selecting (21) candidate 3D plots 31 for detecting (optionally isolated) cables, after plots have been acquired (19) by the scanning sensor and the plots have been transformed (20) into points 30 in an (x,y,z) space referenced to the ground;

ii) using candidate points to detect (22) "primitives" or "traces" 32 of suspended cables on the horizontal plane (xy plane in FIG. 3); this operation making use of a planar Hough transform to find straight line segments that might be traces of cables; and iii) seeking (23) the exact shape of the cable(s) in 3D space in order to present (24) it(them) to the user; this operation also makes use of a Hough transform to detect cables in space in robust manner.

It is possible to filter candidate plots for detecting cables in numerous manners. Filtering makes use of the 3D disposition of the plots 30 in order to select those that are candidates for detecting cables.

Plots 31 that are not situated on the ground are selected by using a method based on surface coherence; the candidate plots are those which have no direct connection with the ground.

The filtering may be performed either "on the fly" by selecting candidate plots for detecting cables as and when "raw" plots are delivered by the telemeter, or else by running through the set of corrected plots in a three-dimensional image in order to distinguish between plots that are connected to the ground and those that are not.

Candidate points can be selected as a function of the connectivity of plots, in particular relative to 4-connectivity (or n-connectivity) over at least three successive scan lines: plots that are candidates for detecting cables are selected from plots that are isolated in terms of proximity characteristics.

Each plot that does not have any neighboring plots is selected as a candidate plot 31; for each of the remaining plots, it is possible to compare the distances at which they are to be found relative to their neighbors in the scan figure in order to verify whether or not there is surface coherence between each plot remaining under consideration and its neighbors.

The plots obtained after filtering are more or less isolated.

In order to determine whether candidate points as selected in this way are in alignment in projection, they are projected (FIG. 3) onto the horizontal (x,y) plane and it is verified whether or not straight line segments are obtained by using a linear Hough transform in two dimensions.

The Hough transform makes it possible, on the basis of parameters, to recognize parametric geometrical shapes by varying the parameters of the looked-for equation as a function of the points encountered. This thus produces a dual space in which accumulation maxima correspond to the looked-for parameters for the looked-for shapes.

By adapting the Hough transform and in order to put bounds on the dual search space, it is preferable to use cylindrical coordinates: for each measurement point which has rectangular coordinates (x,y) when projected into the horizontal plane, the following transform $$r = x*\cos(\theta) + y*\sin(\theta)$$

is performed where r>0 and $\theta$ varies over the range 0 to $2\pi$.

The zones where the accumulations are greatest corresponds to straight lines in the (x,y) space.

By evaluating the most pertinent maxima in the (r,$\theta$) space by calculating the values of accumulations in the transform, straight line segments in the (x,y) plane are detected that correspond to traces of cables on the ground.

In order to avoid detecting a plurality of cables as a single cable, the accumulation neighborhoods in the Hough transform may vary as a function of distance: additional points may be distributed in density around a remote detected point.

Starting with the straight line(s) 32 found on the (x,y) projection by accumulations in Hough space, it is possible to select additional points that are further away, e.g. points having coordinates (x1,y1) and (x2,y2) in the (x,y) plane that correspond to the detected line(s) (cf. FIG. 3); for this purpose, it is possible to vary the limit 35 on the distance separating additional points 34 for selection from the straight line as a function of the distance separating said points from the aircraft; thus, the further plots are away from the aircraft, the broader the strip 36 in which a search is made for additional plots as projected on the ground.

The straight line segments as identified in this way determine vertical planes (33, FIG. 3) in which there may be one or more cables 14; these planes are identified by the straight line equations found by projecting candidate plots onto the ground.

In order to overcome false echoes or the possibility of there being a plurality of cables in the vertical plane, a Hough transform is used that is based on a hyperbolic cosine.

The suspended cable then extends along a curve extending in a vertical plane and corresponding to a hyperbolic cosine (also known as a catenary) whose simplified equation in an (x,y) plane is of the form $$y = a * \mathrm{Cosh}\left(\frac{x}{a} + b\right) + c$$

where the parameter a is the deformation coefficient of the hyperbolic cosine, b corresponds to an x offset (where $-b*a$ is the real offset), and c corresponds to a y offset.

The purpose of the description below is to find the equation(s) of the hyperbolic cosine(s) in planes where filamentary obstacles might be found.

The coordinates of the candidate plots in the initially selected terrestrial coordinate system must be converted in order to obtain the coordinates of said plots in a coordinate system referenced to the plane under consideration, prior to performing a Hough transform in order to identify the parameters of one or more catenaries in said plane, and this needs to be done in each of the planes under investigation.

For each vertical plane under consideration, it is preferable to select a coordinate system referenced to said plane that is such that all of the candidate points have coordinates in said system that are positive.

For this purpose, for a previously-obtained straight line having the equation [y=c*x+d], and for a point having coordinates $(x_k, y_k, z_k)$ situated on (or close to) said line:

if c=0, then the new coordinates of the point in the system referenced to the vertical plane containing the line will be $(x_k, z_k)$;

if the equation of the line is of the form:

$$x = k/k e^{R^+ *}$$

then the new coordinates of the point will be $(y_k, z_k)$; and if d=0, then the new coordinates of the point will be:

$$(\sqrt{x_k^2 + y_k^2}, z_k)$$

Else:

if for x=0 d<0, then the new coordinates of the point will be:

$$\left(\sqrt{\left(x_k + \frac{d}{c}\right)^2 + y_k^2}, z_k\right)$$

else the new coordinates of the point will be:

$$(\sqrt{x_k^2 + (y_k - d)^2}, z_k).$$

Candidate points close to the vertical plane containing the straight line derived from the planar Hough transform are naturally integrated in the set of candidate points by using the above method, which makes it possible where appropriate to correct for distance acquisition errors. Since the distance is a calculated distance, any plots that are not acquired perfectly will be "compensated" in the new plane. If they are not valid, they will be eliminated subsequently (by the following Hough transform).

For convenience of notation and to facilitate understanding, the description below uses the same (x,y) notation to specify the coordinates of a candidate point in a coordinate system referenced to a vertical plane containing one of the above-identified straight lines, where x corresponds to the abscissa axis and y corresponds to the vertical axis (written z above).

For each vertical plane under consideration, and from each triplet of points $(x_n, y_n)$ (n=1,2,3) in the plane under study, a catenary is determined that contains said points, and then on the basis of all of the candidate catenaries that are obtained, a catenary is determined that corresponds to a suspended filamentary object by making use of local accumulation maxima in Hough space (of catenary parameters).

Thus, for each triplet, the following coefficients (or parameters) are determined: a of the hyperbolic cosine, the value b (the real offset along the x axis being equal to $-b*a$), and the value c of the offset along the y axis.

Thus, for each triplet $\{(x_1,y_1), (x_2,y_2), (x_3,y_3)\}$ of candidate points close to or contained in the vertical plane under consideration, determining the parameters a, b, and c of a catenary requires the following system of equations to be solved:

$$\begin{cases} y_1 = a * \text{Cosh}\left(\frac{x_1}{a} + b\right) & (1) \\ y_2 = a * \text{Cosh}\left(\frac{x_2}{a} + b\right) & (2) \\ y_3 = a * \text{Cosh}\left(\frac{x_3}{a} + b\right) & (3) \end{cases}$$

Once this system of transcendal equations has been solved (as described below) for all of the triplets of nearby points, a parametric Hough transform is performed on the triplets, and the maxima in Hough space are determined that correspond to the parameters a, b, and c of existing cables.

In order to improve the speed and the coherence of operations, it is preferable to accumulate a+c, −b*a, and c instead of accumulating a, b, and c, with any values for a that are less than or equal to zero being eliminated automatically.

The method of the invention enables excellent results to be obtained both in terms of time (on pre-filtered and corrected points) and in terms of accuracy; the method can overcome noise and enable all cables to be detected, even when cables are superposed.

The use of this method also makes it possible to detect cables at a large angle of incidence between the cable and the laser beam from the telemeter.

Solving the System of Equations (1), (2), (3)

To solve this system, it is possible to envisage using an iterative Newton's method on the problem as a whole, but the inverse Jacobian matrix that is a function of (a,b,c) is "heavy" to manipulate.

It is preferable to isolate the parameters a and b as a function of known hyperbolic identities:

From equations (1) and (2) above, the following is obtained by subtraction:

$$\Leftrightarrow a * \left(\text{Cosh}\left(\frac{x_1}{a} + b\right) - \text{Cosh}\left(\frac{x_2}{a} + b\right)\right) - y_1 + y_2 = 0 \quad (\alpha)$$

$$\Leftrightarrow a * \left( 2 * \text{Sinh}\left(\frac{\frac{x_1}{a} + b + \frac{x_2}{a} + b}{2}\right) * \text{Sinh}\left(\frac{\frac{x_1}{a} + b - \frac{x_2}{a} - b}{2}\right) \right) - y_1 + y_2 = 0$$

$$\Leftrightarrow 2 * a * \text{Sinh}\left(\frac{x_1 + x_2}{2 * a} + b\right) * \text{Sinh}\left(\frac{x_1 - x_2}{2 * a}\right) = y_1 - y_2$$

$$\Leftrightarrow \text{Sinh}\left(\frac{x_1 + x_2}{2 * a} + b\right) = \frac{y_1 - y_2}{2 * a * \text{Sinh}\left(\frac{x_1 - x_2}{2 * a}\right)}$$

$$\Leftrightarrow \frac{x_1 + x_2}{2 * a} + b = \text{ArcSinh}\left(\frac{y_1 - y_2}{2 * a * \text{Sinh}\left(\frac{x_1 - x_2}{2 * a}\right)}\right)$$

$$\Leftrightarrow b = \text{ArcSinh}\left(\frac{y_1 - y_2}{2 * a * \text{Sinh}\left(\frac{x_1 - x_2}{2 * a}\right)}\right) - \left(\frac{x_1 + x_2}{2 * a}\right)$$

The same reasoning based on equations (1) and (3) makes it possible to obtain:

$$b = \text{ArcSinh}\left(\frac{y_1 - y_3}{2 * a * \text{Sinh}\left(\frac{x_1 - x_3}{2 * a}\right)}\right) - \left(\frac{x_1 + x_3}{2 * a}\right) \quad (\beta)$$

From equations ($\alpha$) and ($\beta$), the following equation (A) is obtained:

$$\text{ArcSinh}\left(\frac{y_1 - y_3}{2 * a * \text{Sinh}\left(\frac{x_1 - x_2}{2 * a}\right)}\right) - \left(\frac{x_1 + x_2}{2 * a}\right) = $$

$$\text{ArcSinh}\left(\frac{y_1 - y_2}{2 * a * \text{Sinh}\left(\frac{x_1 - x_3}{2 * a}\right)}\right) - \left(\frac{x_1 + x_3}{2 * a}\right)$$

The parameter a is calculated from equation (A) by using an iterative Newton's method.

From equation ($\alpha$) or ($\beta$), the parameter b is then calculated, and then the parameter c is calculated from one of equations (1), (2), or (3).

Calculating the Parameter a by Newtonian Iterations

Newton's iterative formula makes it possible to calculate $a_k/(k \in N)$ using the formula:

$$a_{k+1} = a_k - \frac{F(a_k)}{F'(a_k)}$$

where $a_k$ represents an approximate value for a on iterative k.

Thus, from (A), the following is obtained:

$$F(a_k) = \text{ArcSinh}\left(\frac{y_1 - y_2}{2 * a_k * \text{Sinh}\left(\frac{x_1 - x_2}{2 * a_k}\right)}\right) - $$

$$\text{ArcSinh}\left(\frac{y_1 - y_3}{2 * a_k * \text{Sinh}\left(\frac{x_1 - x_3}{2 * a_k}\right)}\right) + \left(\frac{x_3 - x_2}{2 * a_k}\right)$$

Differentiating $F(a_k)$ gives:

$$F'(a_k) = \left(\frac{x_2 - x_3}{2 * a_k^2}\right) + \left(\begin{array}{c} -\dfrac{(y_1 - y_2)}{2 * a_k^2 * \text{Sinh}\left(\dfrac{x_1 - x_2}{2 * a_k}\right)} + \\ \dfrac{(x_1 - x_2) * (y_1 - y_2)}{4 * a_k^3 * \text{Tanh}\left(\dfrac{x_1 - x_2}{2 * a_k}\right) * \text{Sinh}\left(\dfrac{x_1 - x_2}{2 * a_k}\right)} \\ \hline \sqrt{1 + \dfrac{(y_1 - y_2)^2}{4 * a_k^2 * \text{Sinh}\left(\dfrac{x_1 - x_2}{2 * a_k}\right)^2}} \end{array}\right) -$$

$$\left(\begin{array}{c} -\dfrac{(y_1 - y_3)}{2 * a_k^2 * \text{Sinh}\left(\dfrac{x_1 - x_3}{2 * a_k}\right)} + \\ \dfrac{(x_1 - x_3) * (y_1 - y_3)}{4 * a_k^3 * \text{Tanh}\left(\dfrac{x_1 - x_3}{2 * a_k}\right) * \text{Sinh}\left(\dfrac{x_1 - x_3}{2 * a_k}\right)} \\ \hline \sqrt{1 + \dfrac{(y_1 - y_3)^2}{4 * a_k^2 * \text{Sinh}\left(\dfrac{x_1 - x_3}{2 * a_k}\right)^2}} \end{array}\right)$$

In order to determine an initial value a0 that is close to the solution, and in order to ensure that the iteratations converge, the catenary equation is simplified using a third order Taylor series of the hyperbolic cosine; the catenary equation is replaced by the following equation:

$$y_n = a + \frac{x_n^2}{2 * a} + \varepsilon(x^3)$$

This equation is equivalent to a polynomial of the second degree (corresponding to a parabola) and can be written:

$$y_n = A * x_n^2 + B * x_n + C$$

(equation AA) where $$\left(A = \frac{1}{2 * a} \Leftrightarrow a = \frac{1}{2 * A}\right)$$

From a triplet of candidate points $(x_n, y_n)$ with (n=1,2,3), the value of A in equation AA is calculated using the formula:

$$A = \left(\frac{x_3(-y_1 + y_2) + x_2(y_1 - y_3) + x_1(-y_2 + y_3)}{(x_1 - x_2)(x_1 - x_3)(x_2 - x_3)}\right)$$

with this value corresponding to the solution of the system of equations:

$$\begin{cases} y_1 = A * x_1^2 + B * x_1 + C \\ y_2 = A * x_2^2 + B * x_2 + C \\ y_3 = A * x_3^2 + B * x_3 + C \end{cases}$$

This amounts to calculating the initial value a0 using the formula:

$$a0 = \left(\frac{(x_1 - x_2)(x_1 - x_3)(x_2 - x_3)}{2 * (x_3(-y_1 + y_2) + x_2(y_1 - y_3) + x_1(-y_2 + y_3))}\right)$$

This value for a0 serves as a starting point for the Newtonian iterations that enable the value of the first parameter a of the catenary to be determined, and then, as described above, that enable the values also to be determined of the other two parameters of the catenary that the points of the triplet under consideration are close to or form part of.

The invention claimed is:

1. A method of detecting the presence of a filamentary object (14) suspended in the field of view of a telemeter (11) on board an aircraft (10), the method comprising the following steps:

i) calculating terrestrial coordinates (x,y,z) of points corresponding to echoes (S,G,D) delivered by the telemeter, and selecting candidate points from said points;

ii) searching in a horizontal plane for straight line segments that are close to vertical projections of the candidate points; and iii) searching in each vertical plane containing one of the straight line segments found in step ii) for portions of catenaries that are close to the candidate points;

wherein in step iii), for each vertical plane under consideration, and for each triplet of candidate points close to the vertical plane under consideration, the method comprises calculating the values of three parameters a, b, and c of a catenary (of equation of the form y=a*cos h((x/a)+b)+c) containing the projections on the vertical plane of the three points of the triplet under consideration, and then determining the presence of at least one suspended filamentary object as a function of the distribution of values of catenary parameters calculated for all of the triplets of candidate points close to the vertical plane under consideration.

2. A method according to claim 1, in which in order to calculate the three parameters a, b, and c of a catenary containing the three points of a triplet, the calculation begins by estimating a value a0 of a first parameter a; followed by calculating the first parameter a as a function of the estimate a0; and then calculating a second parameter b as a function of the first parameter a; and finally calculating the third parameter c as a function of the first and second parameters a and b; these calculations being performed on the basis of the two coordinates $(x_n, y_n)$ in the vertical plane under consideration of each of the three candidate points in the triplet under consideration.

3. A method according to claim 2, in which in order to calculate an estimate a0 of a first parameter a, the hyperbolic cosine of the catenary equation is replaced by a third order Taylor series.

4. A method according to claim 2, in which an estimate a0 of a first parameter a is calculated using the formula:

$$a0 = \left(\frac{(x_1 - x_2)(x_1 - x_3)(x_2 - x_3)}{2 * (x_3(-y_1 + y_2) + x_2(y_1 - y_3) + x_1(-y_2 + y_3))}\right).$$

5. A method according to claim 2, in which the first parameter a is calculated as a function of the estimate a0 by Newtonian iteration.

6. A method according to claim 5, in which, in iteration (k+1), an approximate value $a_{k+1}$ of the parameter a is calculated as a function of the approximate value $a_k$ obtained at the preceding iteration k by using the formula:

$$a_{k+1} = a_k - \frac{F(a_k)}{F'(a_k)}$$

in which:

$$F(a_k) = \text{ArcSinh}\left(\frac{y_1 - y_2}{2*a_k*\text{Sinh}\left(\frac{x_1-x_2}{2*a_k}\right)}\right) - \text{ArcSinh}\left(\frac{y_1 - y_3}{2*a_k*\text{Sinh}\left(\frac{x_1-x_3}{2*a_k}\right)}\right) + \left(\frac{x_3-x_2}{2*a_k}\right)$$

and in which:

$$F'(a_k) = \left(\frac{x_2-x_3}{2*a_k^2}\right) + \left(\frac{-\frac{(y_1-y_2)}{2*a_k^2*\text{Sinh}\left(\frac{x_1-x_2}{2*a_k}\right)} + \frac{(x_1-x_2)*(y_1-y_2)}{4*a_k^3*\text{Tanh}\left(\frac{x_1-x_2}{2*a_k}\right)*\text{Sinh}\left(\frac{x_1-x_2}{2*a_k}\right)}}{\sqrt{1 + \frac{(y_1-y_2)^2}{4*a_k^2*\text{Sinh}\left(\frac{x_1-x_2}{2*a_k}\right)^2}}}\right) -$$

$$\left(\frac{-\frac{(y_1-y_3)}{2*a_k^2*\text{Sinh}\left(\frac{x_1-x_3}{2*a_k}\right)} + \frac{(x_1-x_3)*(y_1-y_3)}{4*a_k^3*\text{Tanh}\left(\frac{x_1-x_3}{2*a_k}\right)*\text{Sinh}\left(\frac{x_1-x_3}{2*a_k}\right)}}{\sqrt{1 + \frac{(y_1-y_3)^2}{4*a_k^2*\text{Sinh}\left(\frac{x_1-x_3}{2*a_k}\right)^2}}}\right).$$

7. A method according to claim 5, in which, after convergence of the iterative calculation of a, the parameters b and c are calculated analytically.

8. A method according to claim 1, in which, once the values of the three catenary parameters have been calculated for all triplets of candidate points close to the vertical plane under consideration, the presence of at least one filamentary object in said plane is determined by determining the maximum or the maxima in a three-dimensional parameter space based on parameters linked to said three catenary parameters by linear relationships.

9. A method according to claim 8, in which said maxima are determined in the [(a+c),−b*a,c] parameter space.

* * * * *